United States Patent
Kitano et al.

[15] 3,658,407
[45] Apr. 25, 1972

[54] IMAGE TRANSMITTER FORMED OF A PLURALITY OF GRADED INDEX FIBERS IN BUNDLED CONFIGURATION

[72] Inventors: Ichiro Kitano; Ken Koizumi, both of Hyogo-ken; Hiroyoshi Matsumura, Osaka-shi; Koji Ikeda, Mie-ken; Teiji Uchida, Tokyo-to, all of Japan

[73] Assignee: Nippon Selfoc Kabushiki Kaisha, Tokyo-to, Japan

[22] Filed: Aug. 21, 1969

[21] Appl. No.: 851,956

[30] Foreign Application Priority Data

Aug. 22, 1968 Japan....................................43/60120
Aug. 27, 1968 Japan....................................43/61370
Dec. 28, 1968 Japan....................................43/96028

[52] U.S. Cl. .........................350/96 B, 350/175 GN, 355/1, 313/92 LF
[51] Int. Cl. .........................................................G02b 5/16
[58] Field of Search...............350/96 B, 175 GN, 167; 128/6; 313/92 LF; 355/1

[56] References Cited

UNITED STATES PATENTS

| | | | |
|---|---|---|---|
| 2,604,002 | 7/1952 | Wengel............................350/167 UX |
| 3,083,123 | 3/1963 | Navias......................350/175 GN UX |
| 3,320,114 | 5/1967 | Schulz..................................350/96 X |
| 3,434,774 | 3/1969 | Miller ........................350/96 WG UX |
| 2,877,368 | 3/1959 | Sheldon............................350/96 B X |
| 2,979,632 | 4/1961 | MacNeille.........................350/96 B X |
| 3,447,438 | 6/1969 | Kaufer et al. .......................350/167 X |

OTHER PUBLICATIONS

Miller, Article in Bell System Technical Journal, Vol. 44, No. 9, Nov. 1965, pgs. 2,017– 2,030 cited
Kawakami et al., Article in Proceedings of the IEEE, Dec. 1965, pgs. 2,148 and 2,149 cited
Wood, Physical Optics, Textbook 2nd Edition, Published 1911, pgs. 86– 91 cited

*Primary Examiner*—David H. Rubin
*Attorney*—Robert E. Burns and Emmanuel J. Lobato

[57] ABSTRACT

Optical device for transmitting an image wherein a number of optical fibers are disposed in such a manner that they are arranged neatly in the same relative position among them, at least, both ends thereof, each of said fibers having such a refractive index distribution as to substantially satisfy the equation $$n = N(1 - ar^2)$$

in a cross section thereof, where $N$ is a refractive index at a center, $n$ is a refractive index at a distance $r$ from the center, and $a$ is a positive constant, whereby light due to an object placed at one end of said fibers forms an image of the object at the other end thereof.

4 Claims, 17 Drawing Figures

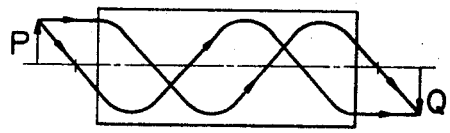
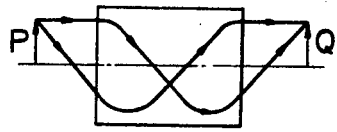
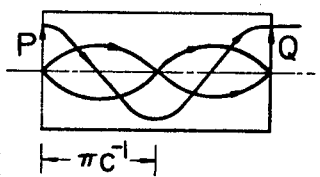
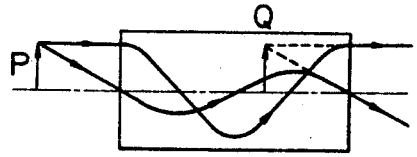
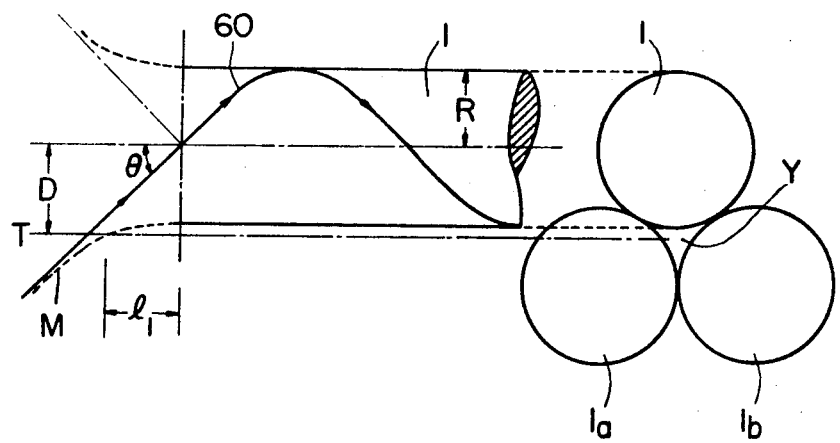

IMAGE TRANSMITTER FORMED OF A PLURALITY OF GRADED INDEX FIBERS IN BUNDLED CONFIGURATION

BACKGROUND OF THE INVENTION

The present invention relates to an optical device for transmitting an image, more specially, to an image transmitting plate and a multi-ocular lens having a high resolving power and a simple structure.

Heretofore, an image transmitting plate, in which a number of optical fibers consisting of a core composed of a light conducting substance of a high refractive index and an enveloping layer made of a light conducting substance of a lower refractive index are arranged and secured, has been known. When such an image transmitting plate as described above is employed as a face plate of a cathode-ray tube, for instance, the light at a fluorescent screen thereof can be directly recorded.

In the above-mentioned image transmitting plate, however, individual optical fibers transmit a quantity of light or light itself merely as spots, so that the resolving degree of the image transmitting plate is determined by the diameter of the optical fibers. Although the resolving degree can be improved to a certain extent by decreasing the diameter of the fibers, there is a limit in the diameter of the optical fibers obtainable, as well as in the resolving degree, because the production of the optical fibers with a diameter less than 10 microns involves much difficulty. Moreover, the production of the image transmitting plate from optical fibers becomes more complex and less efficient with decrease in the diameter of the optical fibers.

Moreover, the production of an optical fiber bundle structure from optical fibers becomes more complex, less efficient and more costly along with decrease in the diameter of the optical fibers. Further deficiencies attendant to the prior optical fiber bundle structures have been that objectives of high magnification are required for observation of images formed thereby and that a variety of attachments have to be prepared for photographing the images.

It has been well-known that when a lens plate, like a multi-ocular, is formed by bundling a plurality of optical lenses, the object pattern photographed by means of said lens plate can be reproduced as a three-dimensional image. That is, when the real image of an object is formed on a photographic dry plate, the image on the dry plate corresponds to the image obtained by viewing the object from a different direction. Accordingly, if the relation between the dry plate and lens plate is correctly set at the same position at the time of photographing and a parallel light beam is radiated from the rear part of the dry plate, said radiated light beam is made to return reversely through the same optical path as the path followed in the photographing, whereby a real image of cubic order is produced and therefore the real image can be viewed as a three-dimensional image by viewing the lens plate from the position confronting with the radiated light beam.

However, for the purpose of manufacturing the multi-ocular to be used for photography and projection of the three-dimensional image as described above, a plurality of microlenses which are arranged in a plane are required and the manufacture of each of said microlenses from a transparent substance is very difficult. That is, a long time and troublesome labor are required for grinding the surface of the transparent substance so as to form thereon plural spherical surfaces each having a predetermined curvature. Furthermore, great skill is required to grind a curvature of a microlens having a very small diameter, and there is a production limit in fabrication by hand. As described above, it is difficult to obtain a microlens having low aberration and small radius of curvature in the case of a lens prepared by providing a curvature on a surface. As a result, from both mass-productive and cost points of view, there are various problems in the manufacture of a multi-ocular.

SUMMARY OF THE INVENTION

It is accordingly a primary object of this invention to provide image transmitters such as image transmitting plates which have a high degree of resolution and are simple in structure.

It is another object of this invention to provide an optical fiber bundle structure in which a plurality of optical fibers each of which has an image transmitting property and a refractive index distribution in a cross section thereof that varies consecutively and parabolically outward from a center portion are disposed in such a manner as to be in close contact with one another at one end and spaced from one another equidistantly at the other end while maintaining the same relative positions among them as at said one end, said optical fiber bundle structure having none of the drawbacks of the conventional optical structures, and having a property of forming a magnified image on a screen, and a high resolving power, and being manufactured with low cost.

It is another object of this invention to provide a mass-productive and practical multi-ocular lens by using an optical fiber having the above-said refractive index distribution as a unit lens element of the multi-ocular lens.

The objects and characteristic features of the invention will become more apparent and more readily understandable by the following description in connection with the drawings, in which the same or equivalent members are designated by the same reference numerals or characters.

BRIEF DESCRIPTION OF THE DRAWINGS

FIGS. 1 through 6 are schematic views for describing the principles of the present invention;

DETAILED DESCRIPTION OF THE INVENTION

In the image transmitter of the present invention, a number of optical fibers are bundled in such a manner that at least both ends thereof are arranged neatly and in the same relative positions among them, each of said fibers having such a refractive index distribution in a cross section thereof as to nearly satisfy the equation:

$$n = N(1 - ar^2),$$

where $N$ is a refractive index at a center, $n$ is a refractive index at a distance $r$ from the center, and $a$ is a positive constant, whereby the light due to an object at one end thereof forms an image at the other end.

That a gaseous substance having the above-mentioned refractive index distribution is capable of functioning as a lens is known as the so-called principle of a gas lens, as is described, for instance, in pp. 180 – 187 of the No. 3, Vol. 36, of "Oyo Butsuri (Applied Physics)," in which a gas lens is said to have an image forming action similar to that of a convex lens. The present inventors have discovered that transparent substances or optical fibers having the refractive index distribution as above described function as a lens.

The optical fibers composing the image transmitter of this invention can be made of such materials as glass and synthetic resin. Especially, in the case of glass, a desired refractive index distribution can be obtained easily by gradually varying the refractive indexes in the interior of the glass by regulating the concentration of the cations constituting the forming oxides of the glass and varying the concentrations of at least two kinds of cations consituting the modifying oxides of the glass, as is described in the Japanese Patent Application No. SHO 43/16986 and its corresponding U.S. Patent application Ser. No. 806,368, filed on Mar. 12, 1969. In the case of synthetic resin, the required refractive index distribution can be obtained by covering a resinous core member with several kinds of resins having different refractive indexes and being mutually diffused at a high temperature and thereafter applying heat thereto to cause a consecutive variation in the refractive indexes.

The optical fibers according to the present invention can function as a lens even when the refractive index distribution thereof roughly satisfies the above-mentioned equation, if not exactly. Even when terms such as $r^4$ and $r^6$ are present in the brackets in the right member of the equation, the functioning of the optical fibers as a lens is not affected if their coefficients are small.

Figure 1:
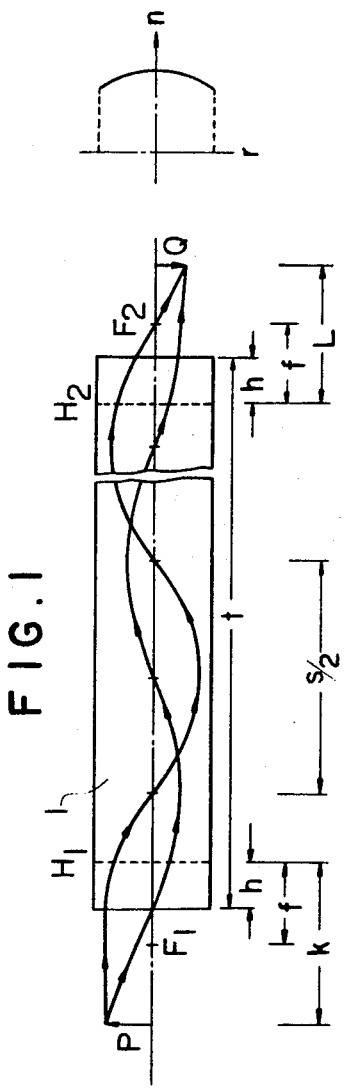

The relationship between an object and its image according to the optical fibers is plotted in FIG. 1, where a transparent substance 1 has a radius R, a length $t$, and a refractive index distribution $n = N(1 - ar^2)$, where $ar^2 << 1$.

The focal distance $f$ of this fibrous transparent lens 1 can be obtained in the same way as the analysis as to a medium having the above refractive index distribution which is described in pp. 465 – 467 in the thesis of Mr. H.Kogelnik appearing on pp. 455 – 494 of the March, 1965, issue of the "Bell System Technical Journal," the U.S. technical magazine. That is, the focal distance $f$ can be obtained by the following equation, when $(2a)^{1/2} = C$:

$$f = (NC \sin Ct)^{-1} \quad (1)$$

In this case, the focal distance $f$ is represented by a distance measured toward a space on the side of an object from a first principal point of the lens or a distance measured toward a space on the side of an image from a second principal point. And the distance $h$ of a corresponding principal plane H as measured inwardly from the end faces of the lens is represented by:

$$h = (NC)^{-1} \tan \tfrac{1}{2} Ct \quad (2)$$

In the drawing, $F_1$ and $F_2$, respectively, designate the positions of focal points on the sides of the object and image, while $H_1$ and $H_2$ represent principal planes on the sides of the object and image.

When an object P is placed at a position in a space on the side of the object at a distance $k$ from the principal plane $H_1$ on the side of the object of the lens 1 and, consequently, an image Q is formed at a position in a space on the side of the image at a distance $L$ from the principal plane $H_2$ on the side of the image of the lens, the equation $$k^{-1} + L^{-1} = f^{-1} \quad (3)$$

is established between the distance $k$ of the object and the distance $L$ of the image when light beam near the center axis is considered, in the same way as in an ordinary lens formula. In this case, the light beam progresses in the interior of the lens while oscillating around nearly a center axis thereof in the form of a sine wave whose inherent wavelength $S$ is $2\pi C^{-1}$.

A condition adapted to equalize the size of the object and that of its image is given by $|k| = |L|$. When a distance measured as a positive quantity from an end face of the lens on the side of an object toward a space on the side of the object is $k_a$, a distance measured as a positive quantity from an end face of the lens on the side of an image toward a space on the side of the image is $L_a$, and $m$ is a positive integer, the above condition is represented by:

$$k_a = I_a = \begin{cases} 2f - h(2m-2)\pi < ct \leq (2m-1)\pi \\ -h(2m-1)\pi < ct \leq 2m\pi \end{cases} \quad (4)$$

or $$ct = m\pi \quad (5)$$

Figure 2:
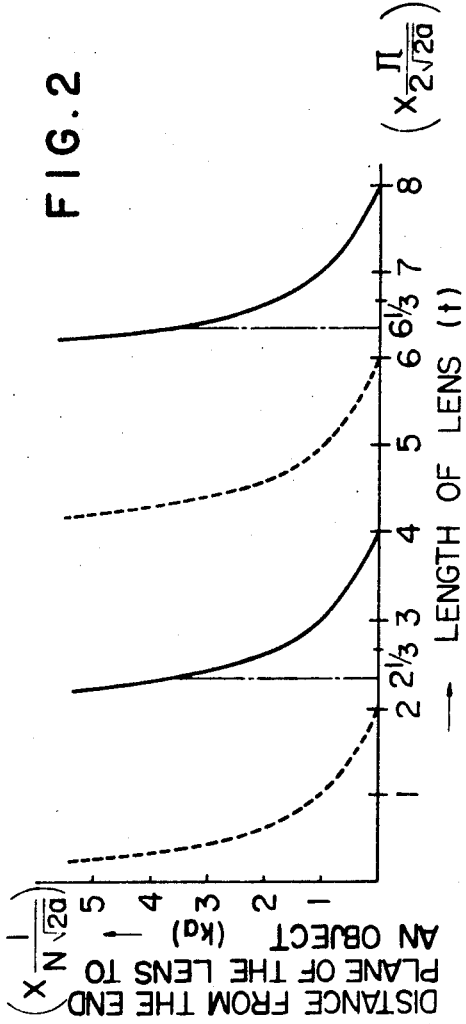

A graphical representation of the above equation (4) is given in FIG. 2, where the axis of abscissa represents the length of the lens, while the axis of ordinates represents the distance between an end face of the lens and an object. The dotted line of the graph designates an inverted real image and the full line denotes an erect real image. An example where an inverted real image of equal magnification is shown in FIG. 3, while FIG. 4 represents an example where an erect real image of equal magnification is formed. When the image transmitter of the invention transmits an image of an object, the optical fiber lenses constituting the image transmitter should form an erect real image or erect virtual image, so that the length t of the lens has to fulfill the equation:

$$(2m-1)\pi c^{-1} < t \leq 2m\pi c^{-1}$$

Also, with an increase of the distance between the lens and an object, overlapping of images due to the lenses constituting the image transmitter becomes more excessive thereby deteriorating the quality of the image transmitted by the image transmitter as a whole. This phenomenon can be prevented by maintaining said distance at a value less than several times that of the lens diameter or by confining the length $t$ of the lens desirably in the range of:

$$\left(2m - \tfrac{5}{6}\right)\pi C^{-1} \leq t \leq 2m\pi C^{-1}$$

, where $m$ is a positive integer. Ranges of the length of the lens expressed by to above-mentioned equation correspond to that of the lens shown, in FIG. 2, at the region from 2 ⅙ to 4 or from 6 ⅙ to 8 by the scale of the horizontal axis.

Now, the equation (5) indicates that when the length of a lens is equal to an integral multiple of a half of its inherent wavelength $S$, an erect or inverted image is formed irrespective of the position of the object, that is, an erect image when the length of the lens is $2m\pi C^{-1}$ and an inverted image when it is $(2m-1)\pi C^{-1}$. FIGS. 5 and 6 shows the relationship between an object and its image when a lens has a length of $2\pi C^{-1}$. In the case of FIG. 5(A), an erect real image Q of equal magnification is formed at one end face of the lens when an object P is placed in close contact with other end face of the lens. When the object P is placed at a definite distance from an end face of the lens, an erect virtual image Q of equal magnifications is formed at a position spaced by a distance equal to said definite distance, inwardly from the other end face of the lens, as illustrated in FIG. 5(B).

The foregoing description is made on the asumption that the refractive index at the external space of the lens is 1. In case the refractive index of the space on the side of the object of the lens is $n_1$ and the refractive index of the space on the side of the image is $n_2$, the condition adapted to equalize the size of the object and that of its image is obtained approximately by substituting $k_a$ in the equation (4) with $k_a/n_1$ and $L_a$ with $L_a/n_2$ and the equation (5) being unchangeable.

In the image transmitter of this invention, a plurality of optical fibers having the aforementioned refractive index distribution are disposed in such a manner that at least both ends thereof are arranged and connected together so that the fibers have the same relative positions at each end of the fiber bundle. That is to say, the order of longitudinal and transverse arrangement of the fibers at one end is made to be the same as that at the other end.

In the present invention, each of the fibers transmits a part of an image and the image transmitter as a whole transmits one complete image.

In the present invention, degradation in resolving power and deterioration in contrast may be caused if the light traveling within the optical fibers constituting the image transmitter is reflected by the fiber surfaces or the light passes through the surfaces and is omitted toward the outside of the optical fibers. A desirable method of avoiding such disadvantages as described above is to secure or envelop the optical fibers with a substance having a refractive index higher than that of the surfaces of said fibers and having a light-absorbing property.

In the present invention, the optical fibers constituting the image transmitter are ordinarily circular in cross section, but the gaps between adjoining fibers render no service for image transmission. Accordingly, in order that the light radiated from a light source being opposite to said gaps can participate in forming an image, the distances between one of the ends of the optical fibers and the light source and between the other of the ends of said fibers and an image have to be more than a certain specified value. When the length of the optical fiber exceeds ½ $\pi C^{-1}$, the above specified value is obtained as follows. First, a condition can be obtained that light from a light source plane corresponding to a point Y the most far from optical fibers among gaps made by the optical fibers in case of bundling a plurality of optical fibers in FIG. 1 in close relation as shown in FIG. 6. In case that the position of the light resides in a range of angle $\theta$ at one end plane of the optical fibers, light from a position fully far from one end plane of the optical fibers can pass inside of the optical fibers (where $\theta$ is expressed by the following equation: $\tan \theta = N \cdot R \cdot \sqrt{2a}$). Also, in case that the position of the light resides inside of the dotted line M in FIG. 6, light from a position relatively near from one end plane of the optical fibers 1 can pass inside of the optical fibers. Therefore, to make the light from light source plane corresponding to a point Y pass inside the optical fibers and focus an image, the position of the light source plane has to reside at a further position from across point between the forementioned dotted line M and the chain line T extended vertically to an end plane from point Y, that is, has to reside at a farther position than a distance $l_1$ approximately expressed by the following equation:

$$l_1 = (N \cdot R)^{-1} (2a)^{-1/2} (D^2 R^2)^{1/2}$$

from one end plane of the optical fibers.

When the optical fibers are arranged, as shown in FIG. 6, in the most packed state, the above-mentioned value $l_1$ become equal to $\sqrt{3}/3N \sqrt{2a}$. This value is calculated assuming that there is an air layer between the light source plane and an end plane of the optical fibers, but in fact a plate made of a glass or other solid transparent body is usually inserted between them, so that the thickness of the above-said plate is always larger than $l_1$. Such gaps as described above can be minimized to a considerable degree, however, by shaping the cross section of each optical fiber into a regular hexagonal or other polygonal shape. In this case, a light source surface and image-forming plane may be almost contacted with both end faces of the optical fibers.

The optical fibers constituting the image transmitter of the present invention are flexible and capable of transmitting images even when they are bent, so that parts other than both ends of the optical fibers may not be fixed so far as the ends are secured. Position of an image can be adjusted only by regulating position of one end face of the optical fiber of the image transmitter, because the image transmitter can be afforded with flexibility.

The optical fibers used in the image transmitter of this invention can be of a considerable large diameter, for instance 50 microns up to 1,000 microns, without failing to obtain a sufficiently high degree of resolution. Thus, according to the invention, an image transmitters having nearly the same or even higher degrees of resolution than prior image transmitting plates can be obtained even when the inventive image transmitter employ fibers of larger diameter than that of the conventional fibers. Also, in the fabrication of an image transmitter of the invention, optical fibers of a large diameter can be used, so that arrangement and securing of the optical fibers can be attained easily and efficiently, thereby to obtain image transmitters at extremely low cost. Especially, when a vacuumtight image transmitter is required, the area occupied by the surfaces of the fibers in an image transmitting plate can be reduced, because optical fibers having a considerable large diameter can be employed according to the invention. Accordingly, the fibers can be secured easily in order to obtain vacuum tightness.

The image transmitter according to the present invention can be utilized as a face plate of a cathode-ray tube, partitions and a face plate of a multistage image tube, a face plate of a facsimile tube, a face plate of a solid image intensifying means, or a photographic recording device for recording electronic images displayed on electronic devices.

The word "fiber" in the present invention means an element having a comparatively small section, for example, a circular section less than several millimeters in diameter and not necessarily having a larger length than cross-sectional diameter. It is apparent to include a rod, stud or disk as a form of the above-mentioned fiber and to include circle or polygon as the sectional configuration thereof.

The invention will be described hereinbelow according to several embodiments thereof.

EMBODIMENT 1

Figure 7:
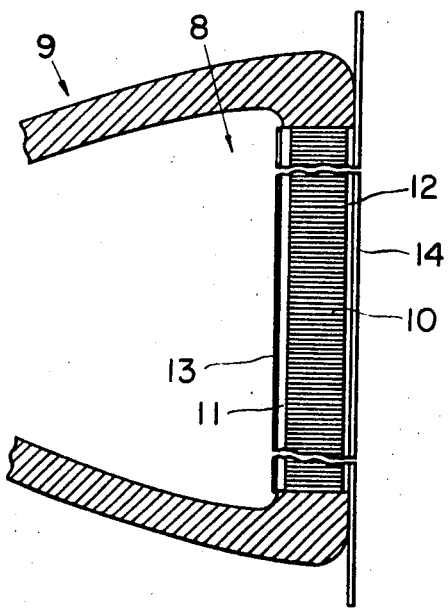
FIG. 7 is a cross sectional view of an essential part of one embodiment of the invention.
Figure 8:
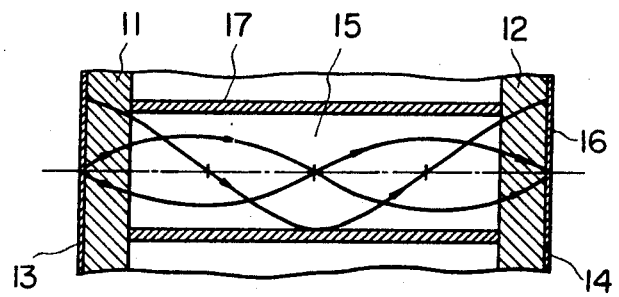
FIG. 8 is an enlarged view of a part of FIG. 7.

Glass fibers with a diameter of 0.8 mm and consisting of 20 wt. % of $Tl_2O$, 12 wt. % of $Na_2O$, 20 wt. % of PbO and 48 wt.% of $SiO_2$ were immersed for a specific period of time in a bath of potassium nitrate held at a high temperature, whereby glass fibers having a center refractive index $n_0$ of 1.60, a surface refractive index of 1.57, and an internal refractive index distribution $n = n_0(1 - ar^2)$, where $a = 11.7$ cm$^{-2}$ were obtained. A number of glass fibers thus obtained were neatly arranged, with the interposition of a colored glass of low melting point therein, to be fused and formed into the shape of a plate. Thereafter, both surfaces of the plate, e.g., end faces of the optical fibers were ground, and glass plates with a thickness of 2.2 mm and a refractive index of 1.70 were attached to both surfaces of said ground optical fiber plate, whereby an image transmitting plate was obtained. The length of each of the optical fibers was selected at 9.72 mm, which according to calculations is the shortest possible length satisfying the condition for obtaining erect images of equal magnification. As shown in FIG. 7, this image transmitting plate 8 was used as a face plate of a cathode-ray tube 9. In the drawing, the reference numeral 10 indicates a bundle of optical fibers secured with one another over the whole length thereof and the numerals 11 and 12 represent glass plates attached to both end faces of the optical fiber bundle 10. A fluorescent substance 13 was coated on an inside surface of the image transmitting plate, to constitute a light source surface. A photosensitive paper 14 was placed in close contact with an outside surface of the image transmitting plate. As illustrated in FIG. 8 showing a part of FIG. 7 in large scale, the light due to the surface of the fluorescent substance 13 passes through the interior of the optical fibers 15 corresponding to the fluorescent screen, forming an erect real image 16 of equal magnification on the photosensitive paper, and the light due to the part of the fluorescent screen corresponding to the interposed colored glass substance 17 passes through the optical fibers near said part except for a part of the light which enters into and is absorbed by the colored glass substance, so that an image being absolutely the same as the luminous image on the fluorescent screen is formed on the photosensitive paper. Light at two points on the fluorescent screen spaced apart by 0.02 mm formed clearly images at two points on the photosensitive paper.

EMBODIMENT 2

Glass fibers with a diameter of 0.2 mm and of the composition described in Embodiment 1 were immersed in a bath of potassium nitrate at a high temperature for a specific period of time, whereby glass fibers having a center refractive index $n_0$ of 1.60, a surface refractive index of 1.57, and an internal refractive index distribution $n = n_0 (1 - ar^2)$, where $a = 1.88 \times 10^2$ cm$^{-2}$ were obtained. A number of glass fibers thus obtained were neatly arranged, with the interposition of colored glass of a low melting point therein, to be fused and formed into the shape of a plate. Both surfaces of the plate-shaped glass fibers were ground to obtain an image transmitting plate with a thickness of 3.24 mm. This was used as a face plate of a cathode-ray tube. A fluorescent substance was coated on an inside surface of the image transmitting plate, while a photosensitive paper was placed in close contact with an outside surface thereof. An image being absolutely the same as that on the fluorescent screen was formed on the photosensitive paper, and light at two points on the fluorescent screen spaced apart by 0.03 mm formed clearly images at two points on the photosensitive paper.

EMBODIMENT 3

Figure 9:
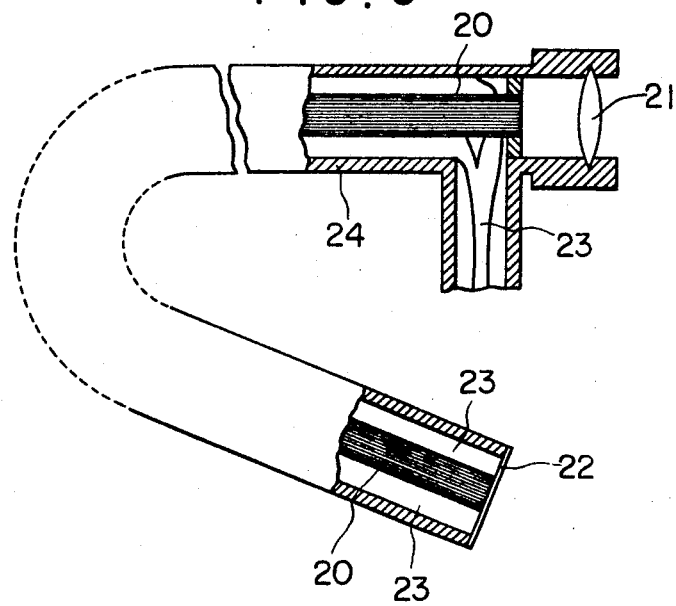
FIG. 9 shows another embodiment, in partial section, of the invention.
Figure 10:
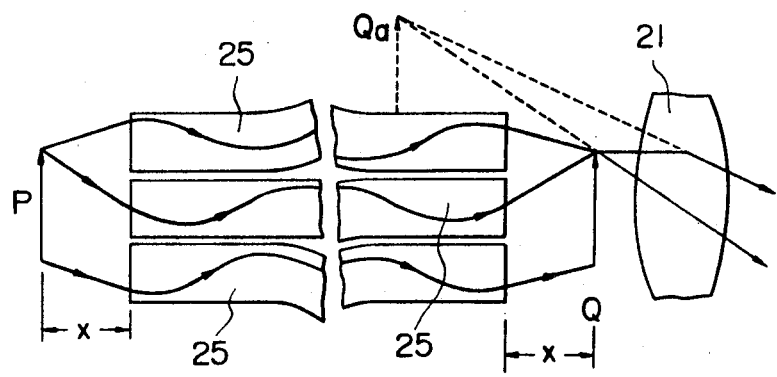
FIG. 10 shows relationship between an object and an image in the embodiment of FIG. 9.

Several tens of glass fibers of the same composition and dimension as those specified in Embodiment 2 were arranged neatly so as to have the same relative positions among them at both ends thereof and the glass fibers were then secured only at both ends with a bonding agent. The fibers were cut to the same definite length. This fiber bundle was employed in a light conducting portion for image transmission, whereby an optical instrument for microscopic inspection as illustrated in FIG. 9 was fabricated. In FIG. 9, the reference numeral 20 represents a fiber bundle described above, 21 represents an ocular lens, 22 designates a protection glass plate, 23 a light guide for illumination, and 24 a sheath. An object at a given distance in front of the instrument was clearly observable. The relationship between the object and its image is represented in FIG. 10. The numeral 25 denotes individual fibers. An erect real image of the same dimensions as the object P is formed at a position spaced apart from the other end of the fiber bundle by a distance equal to the distance $x$ between the leading end of the fiber bundle and the object. This real image Qa was observed as a virtual image Qa by the ocular lens 21. The optical instrument can stand when bent with a radius of curvature of approximately 5 cm. Objects at different distances were observable by adjusting the positions of the ocular lens and an objective provided additionally at the leading end of the fiber bundle.

The cross-sectional refractive index distribution and diameter of the optical fibers constituting the image transmitter of the present invention need not necessarily by equal in the longitudinal direction of the fibers.

Next, when such a refractive index distribution as to substancially satisfy the following equation; $n = N (1 - ar^2)$ (where $N$ is a refractive index at a center of the cross section thereof, $n$ is a refractive index at a distance r from the center and $a$ is a positive constant) is given to an optical fiber, this optical fiber has a lens effect. Now, if it be assumed that a distance between an object and the optical fiber is $L_1$ and the length of the latter is $t$, the distance $L_2$ of the image from the optical fiber is represented by:

$$L_2 = \frac{\cos(\sqrt{2a}t) + \frac{1}{NL_1\sqrt{2a}} \sin(\sqrt{2a}t)}{N\sqrt{2a} \sin(\sqrt{2a}t) - \frac{1}{L_1} \cos(\sqrt{2a}t)} \quad (6)$$

In the above equation, a real image is formed when $L_2$ is positive; and a virtual image when $L_2$ is negative.

The magnification factor $M$ is represented by;
$M = \cos(\sqrt{2a}t) - N\sqrt{2a} \sin(\sqrt{2a}t) \times L_2$ (7)
An erect image is formed when $M$ is positive in the above equation and an inverted image is formed when $M$ is negative.

Figure 11:
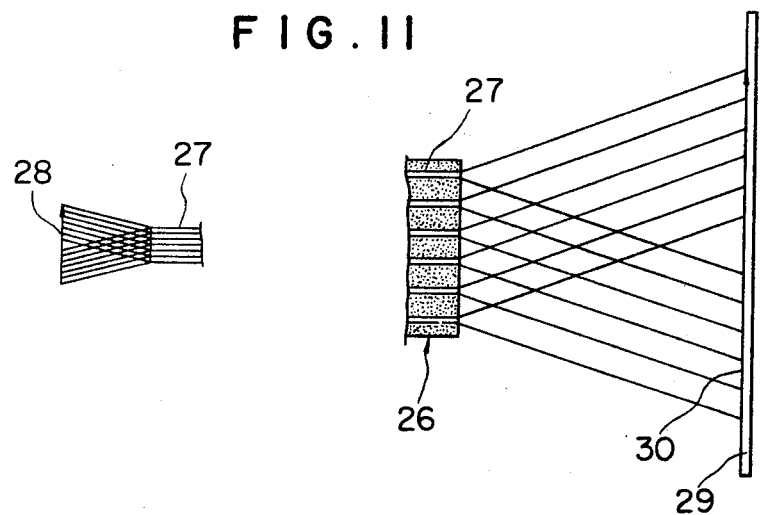
FIGS. 11 and 12 show, respectively, schematic views of two other different embodiments of this invention.

Another novel optical fiber bundle structure according to the invention is characterized by disposing a number of novel optical fibers having a capability of image transmission in such a manner as to be in close contact with one another at one end and spaced from one another equidistantly at the other end while maintaining the same relative positions among them at both ends sides thereof, as is schematically illustrated in FIG. 11.

Figure 13:
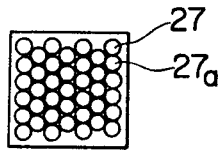
FIGS. 13 and 14 show the arrangements of optical fibers at both ends of light incidence and emission of an optical fiber bundle structure used in the embodiments shown in FIG. 11 and 12.
Figure 14:
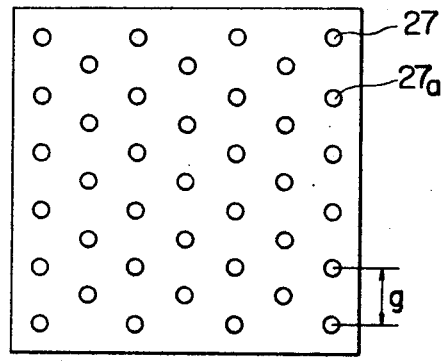

In FIG. 11, the reference numeral 26 represents an optical fiber bundle structure according to this invention, which consists of optical fibers 27 each having such a refractive index distribution in a cross-section thereof as to nearly satisfy the equation $n = N (1 - ar^2)$ and having an image transmitting property. The optical fibers 27 composing the optical fiber bundle strcuture are arranged and secured in close contact with one another at their light incident end faces as shown in FIG. 13, but are spaced from one another equidistantly at their other end faces, as illustrated in FIG. 14. In this case, the relative positions of the fibers 27 are maintained the same at both end faces.

When the length of the optical fibers 27 is $t$, the distance between the optical fiber bundle structure 26 and an object 28 is $L_1$, the distance between the optical fiber bundle structure 26 and a screen 29 is $L_2$, and the magnification factor of the fibers is $M$, a magnified real image 30 can be formed on the screen 29 by regulating the length $t$ and distance $L_1$. When an interval $g$ between adjoining fibers at the light emitting end faces is set at $g = Md$, where $d$ is the diameter of the optical fiber 27, no deviations are caused in the image of the object 28 by the individual fibers when the image is transmitted therethrough and an image of the object 28 is clearly formed on the screen 29 as an image 30, so that clear images are obtainable. The distance $L_2$ between the optical fiber bundle structure 26 and the screen 29 and the magnification factor $M$ in this instance satisfy the foregoing equations (6) and (7).

Figure 12:
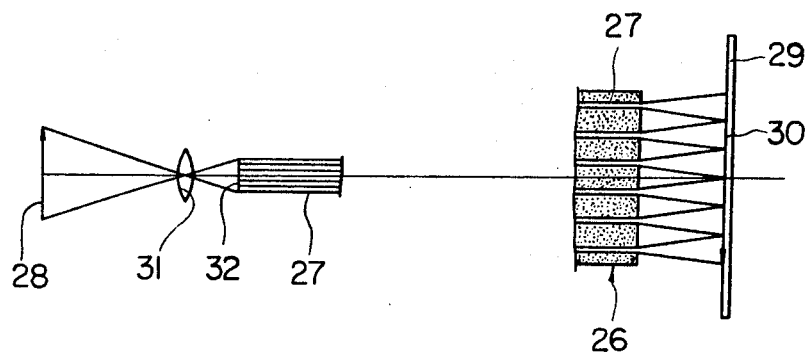

Another embodiment of the invention is shown in FIG. 12, where an image 32 of an object 28 placed in front of an optical fiber bundle structure 26 is formed by a lens 31 on an end plane of the optical fiber bundle structure, said optical fiber bundle structure 26 being fabricated in such a manner that each of the optical fibers 27 has such a refractive index distribution in a cross-section as to nearly satisfy the equation $n = N (1 - ar^2)$ and has an image transmitting property, and wherein the optical fibers are arranged and fixed in the same way as in the case of FIG. 11. Respective parts of the image 32 are transmitted through the respective optical fibers 27, thereby to form a magnified image 30 corresponding to the image 32 on a screen 29. When an interval $g$ between adjoining fibers at the light emitting end plane of the optical fiber bundle structure 26 is set at $g = d/\cos(\sqrt{2a}t)$, where $t$ is the length of the optical fibers 27 and $d$ is the diameter thereof, a clear image 30 having a $M$ times size magnification factor $M$ ( $= 1/\cos \sqrt{2a}t$) to the size of the image 32 is formed on the screen 29 at a distance of $-\tan(\sqrt{2a}t)/n_o \sqrt{2a}$ from the optical fiber bundle structure 26.

In the above embodiment of the invention, a lens may be interposed between the optical fiber bundle structure 26 and screen 29 though no reference has been made to such a lens in the foregoing description.

As has been described above, the optical fiber bundle structure of the present invention is fabricated in such a manner that a plurality of optical fibers each having such a refractive index distribution in a cross-section thereof as to nearly satisfy the equation $n = N (1 - ar^2)$ and having image transmitting property and said fibers are disposed so as to be in close contact with one another at their one end face and spaced from one another equidistantly at their other end face while maintaining the same relative positions among them at both end faces, so that images showing a superior resolving power are easily obtainable. Moreover, such an optical fiber bundle structure can be fabricated easily and at low cost because optical fibers with large diameter can be employed. Furthermore, a clear magnified image is obtained at a certain distance from the light emitting end plane of the optical fiber bundle structure, thus permitting easy observation and picture-taking thereof.

The optical fiber bundle according to the present invention can be obtained by using such optical fibers as to gradually increase their diameter of each optical fiber from one end plane thereof toward the other end plane. In this case, a relative position among fibers at their other end plane is equal to that at their one end plane and can be arranged in an equidistantly spaced relationship by arranging and securing optical fibers at their other end plane in close contact with one another as same as an arrangement at one end plane.

In a light beam transmitter, according to the present invention, a refractive index n thereof at a distance $r$ from a center of crossosection is represented by $n = N(1 - ar^2)$ (where $N$ is a refractive index at a center, a is a positive constant). The focus distance f of the above-said light beam transmitter is represented by $$f = \frac{1}{N\sqrt{2a} \sin (\sqrt{2a}t)}$$

where $t$ is a thickness of the light beam transmitter. Accordingly, when cutting the light beam transmitter to a predeterminal length, the same elements as a lens having a desired focus distance and both flat end faces are obtained.

Figure 15:
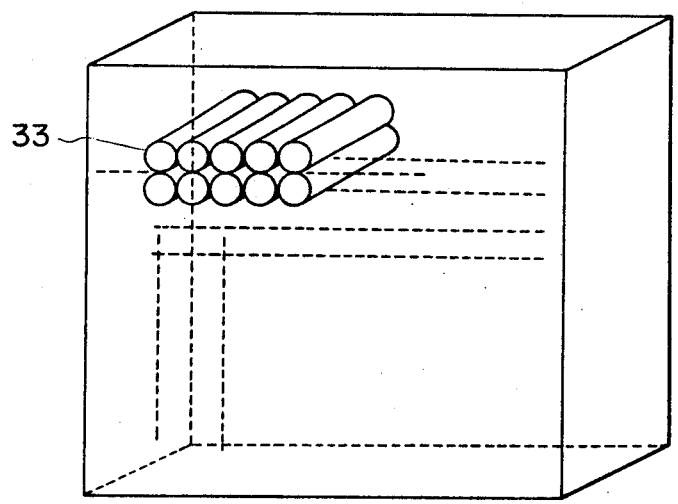
FIG. 15 shows a perspective view of another embodiment of this invention.

Referring to FIG. 15, a multi-ocular is composed of a plurality of unit lens elements 33 which are arranged in parallel, each of said elements consisting of a light beam transmitter. In this example, the refractive index $N$ and the constant $a$ are made equal in all the lens elements. The multi-ocular as described above can be fabricated in the following manner.

Figure 16A:
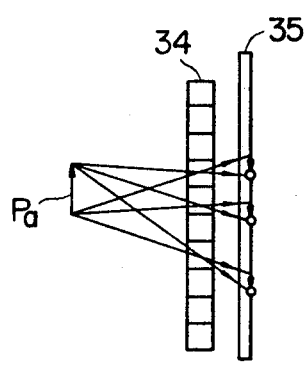
FIGS. 16(A), (B) show, respectively, the schematic side views of two different embodiments in the case of photographing and projecting an object by a multi-ocular lens according to this invention.
Figure 16B:
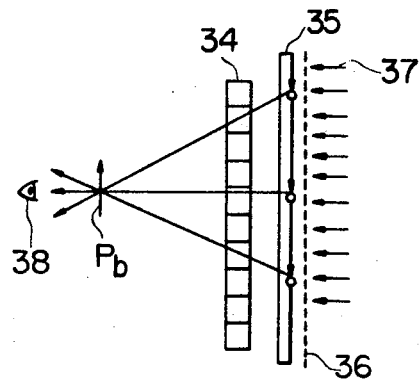

A plurality of the optical transmitters are bundled and cut into a required length, whereby unit lens elements of a group, the focus distances of which are made uniform, can be manufactured at once by only one process. In this process, since there is no work of grinding the lens element to form its curved surface, industrial working for the manufacture of one multi-ocular becomes very easy. FIGS. 16(A) and 16(B) show, respectively, the case of using the multi-ocular for photographing an object and the case of using the same for image projection of an object. In FIG. 16(A), the image of an object $P_a$ is focussed on a dry plate 35 as a plurality of reverse or inverted images by means of unit lenses of the multi-ocular. As well be clear, the reverse images correspond to images obtained by veiwing the object $P_a$ from different directions. The dry plate 35 is subjected to development after exposure thereof. In the case of reproduction of image of an object, as shown in FIG. 16(B), a parallel light beam 37 is radiated through light diffusing plate 36 from back surface of a positive picture dry plate 35. The radiated light beams pass reversely through the dry plate 35 and the lens plate 34 and through the same optical path as that used in the case of photographying, whereby a real image $P_b$ is produced at the position where the object Pa existed. By viewing the image $P_b$ from an eye position 38, the image $P_b$ can be viewed.

Figure 17:
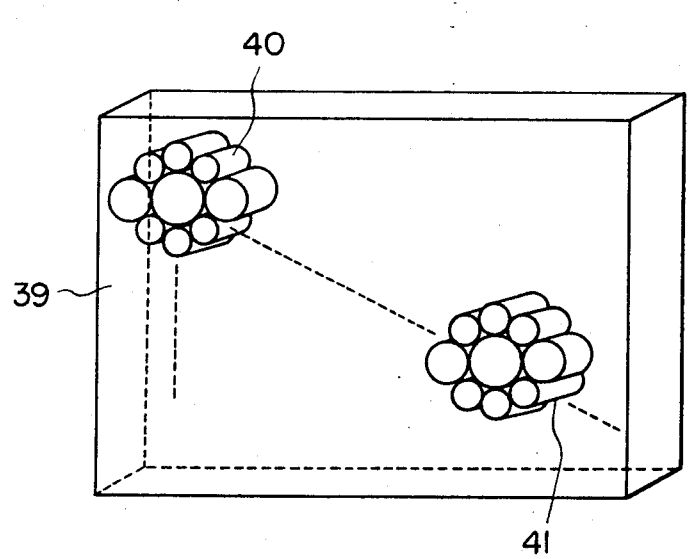
FIG. 17 shows a perspective view of another embodiment of a multi-ocular lens according to this invention.

The positive constant $a$ and the axial length of the multi-ocular are selected so as to be short in a distance between the dry plate 13 and the end plane on the image side of the multi-ocular, preferrably, as to contact them closely. In case the above-mentioned distance becomes larger, sizes of each image focused on the dry plate become large, consequently images by one lens and by the other lens are superposed at a partial portion on the dry plate. This superposition of the images prevents the reproduction of the image. Preferable axial length $t$ of the lens in case of contacting closely the dry plate and multi-ocular, is expressed by the following equation;

$$\left(m - \frac{1}{2}\right)\pi \leq \sqrt{2a}t \leq \left(m - \frac{1}{6}\right)\pi$$

where $m$ is a positive integral number. In case it is necessary to decrease the light absorption by the lens and chromatic aberration of the lens, the axial length $t$ of the lens is selected by using the above-mentioned equation where the condition, $m = 1$ is inserted to the latter. FIG. 17 shows another example, in which a sub-unit lenses 40 is formed by a plurality of unit lenses 39 having, respectively, different refractive index N and constant $a$, and the plural sub-unit lenses 40 are arranged side by side, whereby a multi-ocular is manufactured. In this example also, since the lengths of the unit lenses are made equal, mass-production of the multi-ocular becomes very easy. Differing from the example of FIG. 15, in the example of FIG. 16 the focus distance of each unit lens 39 is repeated with an appropriate period of cycle and only some unit lens among the sub-unit lenses 40 form a clean image on the dry plate. In the case of reproduction of any image, only said image is, emphatically viewed, thus causing an advantage intensifying the stereoscopic effect. Also, in case that an object has comparatively large depth, each unit lens of the above-mentioned sub-unit lens focuses different images on the dry plate, these images being focused to a part of the object residing in a position defined by the focal distance of each unit lens. Therefore, when an image is reproduced, the image having a large depth can be obtained, resulting in intensifying the stereoscopic effect.

The reduction of the resolving power caused by a chromatic aberration of the multi-ocular according to the present invention can be prevented in the following ways. The multi-ocular is fabricated by making the sub-unit lens with three pieces of unit lens provided with monochromatic light filters, that is, red, blue and green at one end plane of the lens and by suitably arranging a plurality of sub-unit lens. Each lens in he sub-unit lens makes only light residing in a specified range of the wave length pass through and makes an image by the passed light focus on the dry plate for natural color, consequently natural colored and stereoscopic image having an excellent resolving power can be obtained. The above-mentioned multi-ocular can be applied to a television device by placing a television projection device at the position of the dry plate, whereby a television signal can be generated. The fact that the axial length of the lens element 34 or 39 is short, that is, the multi-ocular lens plates are thin and mutually arrange in parallel is necessary. However, this fact is not an indispensable condition of the invention, because it is only necessary to arrange the lens elements at input and output sides of light beams. Parallel bundling of the lens elements at the portion between the input sides and output sides is not always necessary.

We claim:

1. An image transmitter comprising: a plurality of optical fibers having bundled configuration wherein at least both ends of the bundled fibers have their fibers arranged in the same relative positions, each of said fibers having a pair of substantially flat end surfaces and wherein the flat end surfaces of the bundled fibers at each end thereof collectively comprise substantially a single planar surface, each of said fibers having a refractive index distribution in a cross section thereof in substantial accordance with the equation $n = N(1 - ar^2)$, where $N$ is the refractive index at the fiber center, $n$ is the refractive index at a distance $r$ from said center, and $a$ is a positive constant, and each of said fibers having a substantially equal length $t$ selected in accordance with the expression $(2m - 1)\pi C^{-1} < t \leq 2m\pi C^{-1}$ where $m$ is a positive integer and $C = (2a)^{1/2}$; image forming means positioned in opposed relationship with respect to one of said planar surfaces for forming an image of an object thereon whereby each of said optical fibers receives a part of said image and transmits same by refraction from said one planar surface to the other of said planar surfaces; and light-sensitive means positioned in adjacent opposed relationship with respect to said other planar surface to receive therefrom the transmitted part of said image from each optical fiber for collectively focusing same as an erect image having the same size as the image initially formed by said image forming means.

2. An image transmitter according to claim 1, including means positioning said fibers in a mutually parallel relationship along their entire length, and wherein two transparent plates each having the same preselected thickness and same refractive index are disposed in close contact with the flat end surfaces of the bundled fibers at each of said planar surfaces.

3. An image transmitter according to claim 2, wherein said means positioning said fibers includes a colored substance surrounding each optical fiber except at its flat end surfaces.

4. An image transmitter according to claim 1, wherein the length $t$ of each fiber is substantially equal to $(2m\pi C^{-1})$.

* * * * *